United States Patent
Haase (10) Patent No.: US 12,139,082 B2
(45) Date of Patent: Nov. 12, 2024

(54) FLUID MANAGEMENT MODULE AND MODULAR SYSTEM

(71) Applicant: Mahle International GmbH, Stuttgart (DE)

(72) Inventor: Kristian Haase, Leinfelden-Echterdingen (DE)

(73) Assignee: Mahle International GmbH (DE)

( * ) Notice: Subject to any disclaimer, the term of this patent is extended or adjusted under 35 U.S.C. 154(b) by 254 days.

(21) Appl. No.: 17/732,498

(22) Filed: Apr. 28, 2022

(65) Prior Publication Data

US 2022/0348154 A1    Nov. 3, 2022

(30) Foreign Application Priority Data

Apr. 30, 2021   (DE) .................... 102021204342.9

(51) Int. Cl.
*B60R 16/03* (2006.01)

(52) U.S. Cl.
CPC .................... *B60R 16/03* (2013.01)

(58) Field of Classification Search
CPC ...................................... B60R 16/03
USPC ......................................... 318/471
See application file for complete search history.

(56) References Cited

U.S. PATENT DOCUMENTS

| | | | | |
|---|---|---|---|---|
| 2006/0190155 A1* | 8/2006 | Meyer | ............... | B60W 50/0098 701/54 |
| 2009/0128068 A1* | 5/2009 | Mullin | ................... | H02K 11/33 439/493 |
| 2019/0353688 A1* | 11/2019 | Books | ............... | G01R 19/0092 |

FOREIGN PATENT DOCUMENTS

| | | |
|---|---|---|
| DE | 10248843 A1 | 5/2004 |
| DE | 10302311 A1 | 7/2004 |
| EP | 1775480 A2 | 4/2007 |

OTHER PUBLICATIONS

Hoffmann (DE 10302311 A1). Motor Vehicle Wiring System, E.g. For Connection To The Load Components Of A Vehicle Door, Whereby Connections Are Made Separately Between High Power Loads And Other Loads And A Central Control Unit Date Published Jul. 29, 2004 (Year: 2004).*
English abstract for EP-1775480.
English abstract for DE-10302311.
German Search Report for DE-102021204342.9, dated Feb. 10, 2022.

* cited by examiner

*Primary Examiner* — Jorge L Carrasquillo
(74) *Attorney, Agent, or Firm* — Fishman Stewart PLLC (57) ABSTRACT

A fluid management module, e.g., for a motor vehicle, is disclosed. The fluid management module includes at least two function components and at least one electrical control/regulating device. The control/regulating device includes a circuit board with electrical connectors. The electrical connectors include a plurality of analogue signal input connectors and at least one component field bus connector, each for electrically connecting to a respective function component via a component field bus, and a vehicle field bus connector for electrically connecting to a CAN bus or LIN bus of a motor vehicle. At least the vehicle field bus connector, the component field bus connector and the analogue signal input connectors are electrically connected to a micro-controller of the control/regulating device provided on the circuit board. At least one of the at least two function components is electrically connected to at least one of the electrical connectors.

21 Claims, 6 Drawing Sheets

FLUID MANAGEMENT MODULE AND MODULAR SYSTEM

CROSS-REFERENCE TO RELATED APPLICATION

This application claims priority to German Application No. DE 10 2021 204 342.9 filed on Apr. 30, 2021, the contents of which are hereby incorporated by reference in its entirety.

TECHNICAL FIELD

The invention relates to a fluid management module for temperature-controlling a motor vehicle, and to a module arrangement and a motor vehicle, each of which include such a fluid management module. The invention, further, relates to a modular system and to a method for operating such a fluid management module.

BACKGROUND

So-called fluid management modules in the most general of cases is to mean installations which serve, in a vehicle, in particular with electrical energy store and with electric drive motor, to interact with a fluid functioning as transport medium for transporting heat and to transport the same in a fluid circuit.

Such fluid management modules can be employed for example as heat management module, which is incorporated in a temperature-control circuit in order to temperature-control a temperature-control fluid circulating in the temperature-control circuit. For this purpose, the heat management module or fluid management module can comprise one or more fluid pumps for conveying the temperature-control fluid and multiple valves for controlling the flow through the different fluid paths of the fluid management module or of the temperature-control circuit. With the help of a heat exchanger integrated in the heat management module, which is also known to the person skilled in the art by the designation "chiller", heat can be supplied to or extracted from the temperature-control fluid.

In another design, the fluid management module can also be employed as cold management module, which as part of an air-conditioning system is integrated in a refrigerant circuit of the air-conditioning system that can be flowed through by a refrigerant. In this variant, the cold management module can also comprise multiple electrically controllable valves, but instead of fluid pumps can be equipped with a compressor by means of which the refrigerant cannot only be conveyed but also compressed.

In a further variant, the fluid management module incorporated in a coolant circuit can be used as cooling module for the so-called immersion cooling of a coolant circulating in the coolant circuit.

In the said fluid management modules, a multiplicity of so-called function components such as the mentioned electric fluid pumps and electrically controllable valves is typically arranged.

In addition to this, a multiplicity of sensors, in particular pressure and temperature sensors are typically installed in such a module generate and provide the sensor data relating to the current operating state of the module.

Here, the electrical control of the said function components with the help of a suitable control/regulating device typically proves to be highly complex and thus costly. Such a control/regulating device typically includes a circuit board arranged in a housing, on which at least a micro-controller and electrical connectors are provided, via which the micro-controller can be electrically connected to the function components of the fluid management module. Typically, the micro-controller can communicate in a data-transferring manner with function components via a so-called LIN bus. However it is also conceivable that function components of simpler construction such as for example sensors communicate with a micro-controller and transmit sensor data to the same via analogue signal lines. Since a fluid management module can be employed in manifold ways there also exist different designs of such a fluid management module; this in turn means that the control/regulating device, with respect to the electrical connectors provided on the circuit board, has to be individually adapted to each design. However, this involves substantial additional costs in the production of the control/regulating device and thus of the entire fluid management module.

It is therefore an object of the present invention to create an improved or at least alternative embodiment for a fluid management module in which the problem explained above is taken into account. In particular, a fluid management module with as simple as possible an electrical wiring structure is to be created, so that both the assembly effort as well as the cost framework for producing such a fluid management module is reduced.

According to the invention, this object is solved through the subject of the independent patent claim(s). Advantageous embodiments are subject of the dependent claims.

SUMMARY

Accordingly, the basic idea of the invention is to provide a fluid management module for a fluid comprising electrical function components with a control/regulating device, whose circuit board arranged in a housing of the control/regulating device is equipped with electrical connectors so that the control/regulating device with the circuit board can be employed in various designs of the fluid management module.

Those electrical connectors, which are required for interacting with the said electrical function components, in particular controlling these function components by the control/regulating device or for transmitting signals—in particular sensor signals—from the function components to the control/regulating device can thus be led from the circuit board out of the housing interior to the outside by means of suitable electrical connection lines, where in turn an electrical connection with the respective function component can take place. Those electrical connectors, which are not needed in certain designs of the fluid management module—in particular because the maximum quantity of the function components that can be connected to the control/regulating device is not present in this design—need not, by contrast, be electrically led out of the housing to the outside. This measure makes it possible to already use a standard circuit board for the different designs of the fluid management module, which in particular with respect to the number and design of electrical connectors provided on the said circuit board can be uniformly used in different designs. This leads to reduced development and production costs in particular of different designs of the fluid management module according to the invention.

A fluid management module according to the invention, in particular for a motor vehicle, includes at least two function components, in particular for a fluid. Further, the fluid management module includes an electrical control/regulating device which in turn comprises a circuit board with electrical connectors. These electrical connectors include multiple, preferentially at least five, analogue signal input connectors and at least one component field bus connector, in particular LIN bus connector or CAN bus connector— each for electrically connecting the control/regulating device preferably via a component field bus, which can particularly preferably be a LIN bus or CAN bus, each having one of the at least two function components. "Multiple" here means that according to the invention at least two analogue signal input connectors have to be present. The fluid management module according to the invention, further, includes a vehicle field bus connector, preferentially a CAN bus connector or a LIN bus connector, for electrically connecting the control/regulating device to a vehicle field bus, preferably a CAN bus or a LIN bus of a motor vehicle. At least the vehicle field bus connector, the component field bus connector and the at least five analogue signal input connectors are electrically connected to the micro-controller of the control/regulating device provided on the circuit board. These electrical connectors can be realised through electrical conductor tracks formed on the circuit board. According to the invention, at least one of the at least two function components are electrically connected to at least one of the electrical connectors.

The vehicle field bus connector and the component field bus connector can thus be each formed—independently of one another—preferably as CAN bus connector or as LIN bus connector depending on whether the vehicle field bus or the component field bus is a CAN bus or a LIN bus.

Practically, the control/regulating device includes a housing surrounding a housing interior, wherein the circuit board is arranged in the housing interior. At least one of the electrical connectors of the circuit board in this variant is electrically led out of the housing interior for electrically connecting to the at least one function component. Thus, the function component can be electrically connected to the circuit board outside on the housing.

According to an advantageous further development, the control/regulating device includes at least one electrical connection line by means of which at least one of the electrical connectors is led from the circuit board out of the housing interior. The electrical connection line can be in particular a cable of an electrically conductive material, preferably with an electrically insulating sheathing. The electrical connection line or the electrical cable can on the one end be electrically conductively connected to the respective connection on the circuit board and on the other end electrically conductively connected to a housing connector present outside on the housing.

Preferably, the at least one function component is electrically connected to the micro-controller via the electrical connector electrically led out of the housing interior.

Particularly preferably, all electrical connectors, in particular signal input connectors present on the circuit board can be electrically led out of the housing interior to the outside. Thus, the maximum functionality of the circuit board with the micro-controller can be accessed.

In a variant that is alternative to this, at least one electrical connector provided on the circuit board, in particular signal input connector, is not led out of the housing interior, so that the micro-controller cannot be connected or is not connected to a/the function component via this connection. In further developments, this can also apply to two or more electrical connectors. In this way, material costs, which are accompanied by the respective electrical connector being led out of the housing interior, can be saved when the fluid management module using the circuit board does not at all require the said electrical connector or signal input connector in order to receive electrical signals from a function component. In particular it is not necessary to develop and provide a circuit board of a reduced quantity of signal input connectors specifically adapted for this purpose. On the contrary, the standardised circuit board mentioned at the outset can be used as part of the control/regulating device.

Particularly practically, all electrical connectors led out of the housing interior, in particular signal input connectors of the circuit board are electrically connected to a/the function component of the fluid management module. This means that in the fluid management module all electrical connectors, in particular signal input connectors, are used.

Alternatively to this it is also conceivable, however, that at least one electrical connector, in particular signal input connector provided on the circuit board and led out of the housing interior is not electrically connected to a/the function component. This allows using the standardised circuit board mentioned at the outset in the control/regulating device without the same having to be adapted in terms of the quantity of required connections or signal input connectors.

According to an advantageous further development, at least two, preferentially exactly two, component field bus connectors can be provided on the circuit board. Since the quantity of function components that is typically controllable by means of a component field bus is limited, it is possible by providing two or more component field bus connectors for connecting a respective component field bus, to connect any quantity of function components electrically to the micro-controller provided on the circuit board. In this variant, it is conceivable that a first component field bus connector is a LIN bus connector and a second component field bus is a CAN bus connector.

According to another preferred embodiment, the at least one function component can include or be an electrically controllable valve. Alternatively or additionally, the at least one function component can include or be a controllable fluid pump. Alternatively or additionally, the at least one function component can include a temperature sensor or be a temperature sensor. Alternatively or additionally, the at least one function component can include a pressure sensor or be a pressure sensor.

According to a further advantageous further development, the fluid management module can include a component carrier for carrying the function components and the control/regulating device. The housing of the control/regulating device in this further development is releasably or non-releasably fastened to the component carrier and/or to at least one of the function components. Here, the releasable fastening of the housing is realised by means of at least one screw connection and/or clip connection and/or latching connection. Alternatively or additionally, the non-releasable fastening of the housing can also be realised by means of at least one rivet connection and/or soldered connection and/or welded connection and/or bonding connection.

Further, the invention relates to a module arrangement having a first and having at least one second fluid management module each introduced above and according to the invention. The advantages of the heat management module according to the invention explained above thus also apply to the module arrangement according to the invention. According to the invention, the electrical connectors of the control/regulating device of the respective fluid management module provided on the respective circuit board are built identically. In particular, two or more heat management modules, which are built identically or differently, can be integrated in the same fluid circuit by means of the module arrangement according to the invention. It is obviously also conceivable however to incorporate the at least two fluid management modules of the module arrangement in different fluid circuits.

According to a preferred embodiment, a first circuit board of the first fluid management module and a second circuit board of the at least one second fluid management module are built identically. Because of this, the production costs for the fluid management modules of the module arrangement are reduced.

Preferably, an electrical connector provided on the first and second circuit board each built identically—i.e. with identical function or identical electrical connection to the micro-controller—can be electrically connected in the case of the first fluid management module to a function component of the first fluid management module. In the case of the second fluid management module, the said electrical connector in this variant by contrast is not electrically connected to a function component of the second fluid management module.

Particularly practically, it can be that the electrical connector of the second fluid management module that is not connected to a function component is not electrically led from the circuit board of the control/regulating device out of the housing interior of the second fluid management module. In this way, manufacturing costs can be saved.

According to an advantageous further development, the control/regulating device of the first fluid management module can communicate with the control/regulating device of the second fluid management module in a data-transmitting manner so that the control/regulating device of the first fluid management module assumes the function of a main control/regulating device and controls the control/regulating device of the second fluid management module functioning as sub-control/regulating device. In this way, a so-called "master-slave operation" of the two fluid management modules is realised. This simplifies controlling the existing fluid management modules. In particular, a parallel control of the second fluid management module configured as sub-module from the motor vehicle can be omitted or at least take place only to a reduced extent. In various further developments it is conceivable that the main control/regulating device also controls two or more sub-control/regulating devices as described above.

The invention also relates to a modular system having a module reservoir which comprises a plurality of basic modules each of which includes at least two function components for a fluid. Here, the individual basic modules differ from one another in the type and/or quantity of the function components. Apart from this, the basic modules do not comprise any control/regulating device with housing and circuit board. Instead, the modular system includes a control/regulating device comprising a circuit board with electrical connectors. Here, the electrical connectors include at least five analogue signal input connectors and at least one component field bus connector, which are each equipped for electrically connecting the control/regulating device to a function component of each of the basic modules via a component field bus. Further, these connections include a vehicle field bus connector for electrically connecting the control/regulating device to a vehicle field bus of a motor vehicle. With the modular system according to the invention, the control/regulating device is formed so that it can be combined with each of the basic modules, namely in such a manner that the control/regulating device and the selected basic module forms a fluid management module according to the invention explained above. Thus, each of the basic modules is complemented by the control/regulating device—built identically for all basic modules—to form a fluid management module according to the invention. Thus, the modular system according to the invention allows using a control/regulating device with a circuit board arranged in a housing, which with respect to the electrical connectors present on the said circuit board, in particular with respect to the analogue signal input connectors present on the same can, built identically, can be installed and used in different designs of a fluid management module according to the invention. Here, only those electrical connectors or input connectors have to be mandatorily led out of the housing interior to the outside and electrically wired which in the respective design are also needed for electrical connections to respective function components.

Further, the invention relates to a motor vehicle having an electric battery and/or having a battery/electric drive. The motor vehicle according to the invention includes a temperature-control circuit for temperature-controlling the electric battery and/or the battery-electrical drive, wherein the temperature-control circuit comprises a temperature-control module according to the invention explained above. The advantages of the temperature-control module according to the invention explained above thus apply also to the motor vehicle according to the invention.

Further, the invention relates to a method for operating the fluid management module according to the invention introduced above, wherein via a component field bus, preferentially via at least one LIN bus or CAN bus, at least one function component can be connected to the component field bus connector—or LIN bus connector or CAN bus connector—and thus connected to the micro-controller in a data transferring manner. The basic idea of the method according to the invention accordingly is to configure the micro-controller of the control/regulating device for controlling the function components of a fluid management module so that it can be operated in two different operating modes and so that it can be switched over between these. In a first operating mode, control commands received from a vehicle field bus are not evaluated by the micro-controller but directly passed on for controlling the function components of the fluid management module to a component field bus, to which the function components are connected. This allows controlling the function components directly from the vehicle field bus. Here, the micro-controller can quasi "interpret" the control commands received from the vehicle field bus so that these interpreted control commands are further processed on the component field bus. In terms of content, the commands received from the vehicle field bus however remain unchanged in the first operating mode when passed on to the component field bus via the micro-controller.

By contrast, control commands received on the vehicle field bus in a second operating mode are not "looped through" by the micro-controller as in the first operating mode, i.e. passed on unprocessed, but processed by the micro-controller provided on the circuit board. During the course of this processing of the higher-ranking commands received from the vehicle field bus, corresponding individual commands can be sent to the function components by the micro-controller via the component field bus. In this way, the fluid management module can be largely operated independently. In particular, it is no longer necessary as in the first operating mode to send so-called "low level" commands from the vehicle field bus, directly and unprocessed, to the function components. It is rather sufficient to send only higher-ranking commands which activate or change a certain function mode of the fluid management module or one or more of its function components, which can relate in particular to the interaction of multiple function components, to the micro-controller. The individual control of the function components required for implementing such a function mode is assumed in the second operating mode by the control/regulating device or the micro-controller of the same. Such a "modular" control of the function components simplifies the controlling of the fluid management module via the vehicle field bus. Apart from this, the fluid management module can be controlled with a high level of flexibility by providing the two operating states explained above.

With the method according to the invention, a fluid management module according to the invention introduced above is controlled. According to the invention, the micro-controller of the module can be switched over between a first and at least one second operating mode. In the first operating mode, control commands received from the vehicle field bus are directly passed on to the component field bus by the micro-controller for controlling the function components concerned and in the process remain at least in terms of content, unchanged. By contrast, control commands received from the vehicle field bus in the second operating mode are initially processed by the micro-controller as so-called higher-ranking control commands, which means that the individual controlling of the function components concerned is carried out by the micro-controller.

According to a preferred embodiment of the method, the micro-controller, in at least one second operating mode controls at least one function component, preferably multiple function components as a reaction of at least one higher-ranking control command received from the vehicle field bus. Thus it is not necessary to transmit a multiplicity of individual commands to the respective function component. The detailed controlling of the function component concerned can rather take place via the micro-controller or be effected from the same. Thus, higher-ranking control commands which can activate or change or deactivate a higher-ranking function mode of the fluid management module, can be transmitted from the vehicle field bus to the micro-controllers, where these are processed for the individual controlling of the individual function components. Depending on the series of the fluid management module, the individual control of the function components installed in the fluid management module can thus be individually adapted. Compared with this, higher-ranking commands which are transmitted to the micro-controllers via the vehicle field bus can also be uniformly used for different series. This simplifies controlling different series of the fluid management module which can differ from one another in particular in the composition or the individual controlling of individual function components, since the individual composition of the fluid management module from different function components when generating and sending a higher-ranking control command to the micro-controllers can remain disregarded.

Particularly preferably, no commands provided by the vehicle field bus are processed by the function components in the at least one second operating mode. This supports the multi-stage approach explained above, in which the function components do not require any direct communications connection to the vehicle field bus.

According to an advantageous further development, the micro-controller, in the at least one second operating state, is equipped/programmed for carrying out at least one function mode, preferentially two or more function modes of the fluid management module. In this further development, the controlling, in the at least one function mode, of at least one, preferentially multiple function component(s), takes place independently of the vehicle field bus. Preferably, the control can take place according to a predetermined control strategy or regulating strategy assigned to the respective function mode. According to such a control strategy or regulating strategy, two or more function components can also be controlled. Obviously, two or more such control strategies or regulating strategies can also be assigned to a respective function mode.

According to a further advantageous further development, at least one regulating loop with at least one regulating variable and with at least one adjusting variable that is adjustable in a function component can be carried out by the micro-controller in the at least one function mode. In this further development, a set point value of the at least one regulating variable can be additionally provided at higher-ranking control command from the vehicle field bus to the micro-controller and controlled by the micro-controller for setting the adjustable variable of the respective function component. Because of this, the regulation of the said function component(s) with the help of the micro-controller, in which a corresponding regulating algorithm can be integrated in terms of software, can be carried out independently. In particular, no monitoring of the regulating algorithm via the vehicle field bus is required. By contrast, higher-ranking commands can be received via the vehicle field bus which can generally relate to the implementation of the regulating loop. This also includes the already mentioned variation of a certain regulating variable.

According to an advantageous further development, the micro-controller can be switched over into a third operating state. In this further development, the adjusting of the at least one function mode, in particular the switching-over from a set function mode into another function mode takes place in the second operating mode, by means of a higher-ranking control command received by the micro-controller from the vehicle field bus. In the third operating mode, the adjusting of the at least one function mode, in particular the switching-over from a set function mode into another function mode takes place independently by the micro-controller, in particular without receiving a corresponding higher-ranking control command from the vehicle field bus. Thus, the third operating mode allows, compared with the second operating mode, operating the fluid management module with a greater degree of independence.

According to another preferred embodiment, the control of the function components in the at least one second operating mode, in particular in the second or third operating mode, includes receiving and evaluating sensor signals from at least one of the function components by the micro-controller.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 1:
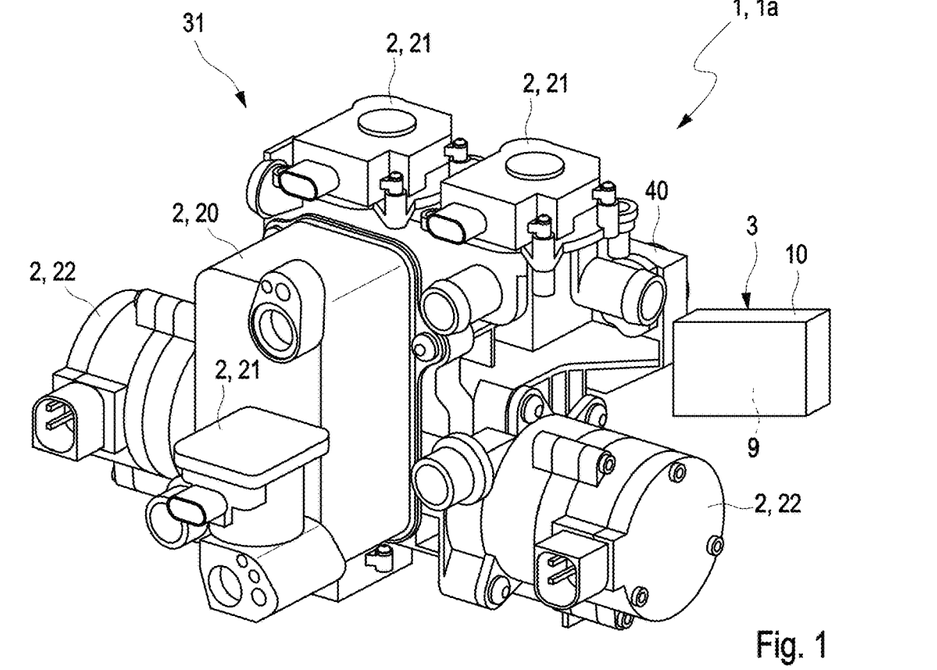
FIG. 1 an example of a fluid management module designed as heat management module in a perspective representation, FIG. 2 a schematic representation of the heat management module of FIG. 1, in which the incorporation in a temperature-control circuit of the same is shown, FIG. 3 a circuit diagram-like representation of the heat management module of the FIGS. 1 and 2, which shows the electrical wiring of the heat management module including the control/regulating device of the same, FIG. 4 a circuit diagram-like representation of the control/regulating device and the circuit board of the same, in which in particular the electrical connectors provided on the circuit board are shown, FIG. 5 an example of a fluid management module designed as immersion cooling module in a perspective representation, FIG. 6 a schematic representation of the immersion cooling module of FIG. 1, in which the incorporation in a temperature-control circuit of the same is shown, FIG. 7 a circuit diagram-like representation of the immersion cooling module of the FIGS. 1 and 2, which shows the electrical wiring of the heat management module including the ECU of the same, FIG. 8 a diagram-like representation illustrating the various possible operating modes of the fluid management module.
Figure 2:
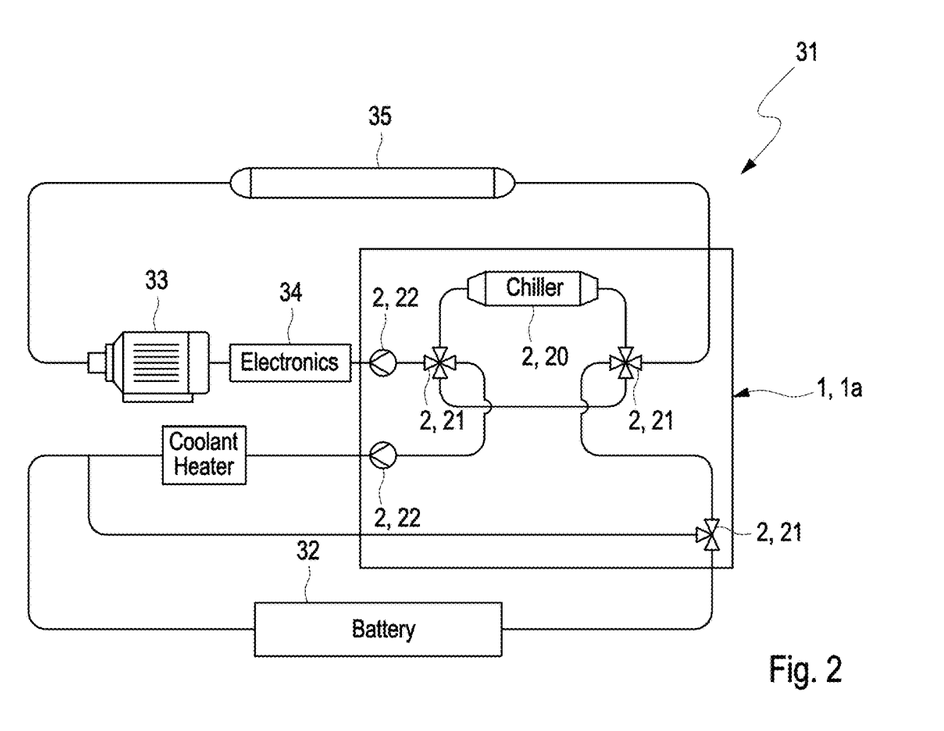
Figure 3:
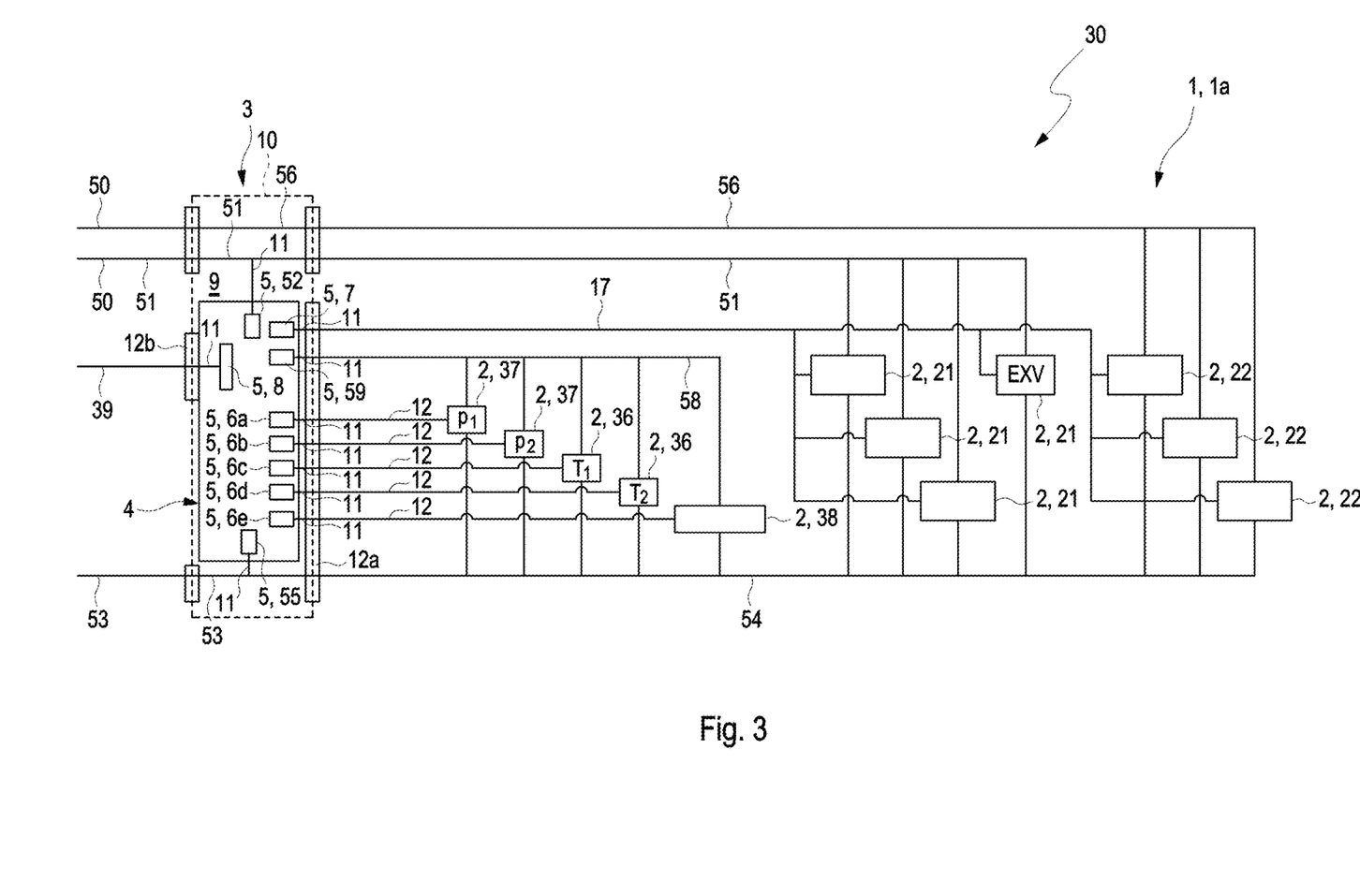

FIG. 1 illustrates in a perspective representation an example of a fluid management module 1 for a motor vehicle according to the invention. In the example of FIG. 1, the fluid management module 1 is a heat management module 1a, which can be incorporated in a temperature-control circuit 31 present in the motor vehicle, as it is schematically shown in FIG. 2. FIG. 3 shows a circuit diagram-like representation of the electrical wiring of the fluid management module 1.

In the temperature-control circuit 31 according to FIG. 2, a temperature-control fluid can circulate. In addition to the fluid management module 1 or to the heat management module 1a, a battery 32 to be temperature-controlled, an electric drive 33 to be temperature-controlled and a power electronic device 34 to be temperature-controlled—each by means of the temperature-control fluid F—of the motor vehicle equipped with the fluid management module 1 or heat management module 1a can also be arranged in the temperature-control 31. Further, as indicated in the temperature-control circuit 31 in FIG. 2, a heat exchanger 35 can also be arranged, by means of which heat can be supplied to or extracted from the temperature-control fluid circulating in the temperature-control circuit 31.

According to the FIGS. 1, 2 and 3, the fluid management module 1 includes multiple function components 2, which can be designed so as to be electrically controllable. Further, the fluid management module 1 or the heat management module 1a according to FIG. 1 includes a component carrier 40 for carrying the function components 2. For the respective function component 2, the component carrier 40 can comprise a suitable mechanical component interface. The respective component interface can be adapted to the respective shape and size and the function of the respective function component 2. A respective function component 2 is then releasably fastened to the component carrier 40 via the respective component interface. However, a fixed, i.e. non-releasable fastening is also conceivable. On the component carrier 40, a fastening interface can be additionally moulded which the component carrier 40 and thereby the module 1 can be fastened to a body of the vehicle.

The said function components 2 in the exemplary embodiment are a chiller 20, an expansion tank (not shown), four electrically controllable valves 21 (see FIG. 3) and three fluid pumps 22, wherein in the FIGS. 1 and 2 only two fluid pumps 22 each are shown. Apart from this, the module 1 includes a heat exchanger designed as a chiller 20 and an expansion tank (not shown). Further function components 2 can be two shown temperature sensors 36, two pressure sensors 37 for determining fluid temperature and fluid pressure of the temperature-control fluid in different locations in the temperature-control circuit and a filling level sensor 38 (each only shown in the circuit diagram-like representation of FIG. 3) for determining a filling level of the expansion vessel with the temperature-control fluid which is not shown.

Further, the module 1 includes an electrical control/regulating device 3 for controlling the electrical function component 2, which, like the function components 2, can be fastened on the component carrier 40. The control/regulating device 3 comprises a housing 10 surrounding a housing interior 9.

The control/regulating device 3 according to the FIGS. 1 and 3 includes a circuit board 4 (not shown in FIG. 2 for the sake of clarity). On the circuit board 4, a micro-controller 15 and multiple electrical connectors 5 as well as multiple electrical connectors 5 electrically connected to the micro-controller 15 for connecting the micro-controller 15 to the mentioned function components 2. For this purpose, the electrical connectors 5 provided on the circuit board 4 are electrically led out of the housing interior 9.

The electrical connectors 5 in turn include five analogue signal input connectors 6a to 6e and a component field bus connector, which in the example is formed as a LIN bus connector 7. In variants of the example, a different quantity of signal input connectors—but mandatorily however multiple, i.e. at least two signal input connectors—have to be provided. The LIN bus connector 7 is electrically connected to a component field bus—in the example a LIN bus 17—of the fluid management module 1, which in turn is connected to function components 2 in the form of the valves 21 and the fluid pumps 22 in a data-transferring manner. Instead of a LIN bus 17, a CAN bus can also be used as component field bus, wherein in this case a CAN bus connector is provided as component field bus connector.

In the example scenario of the FIGS. 1 to 3, all five analogue signal input connectors 6a to 6e are each electrically connected to a respective function component 2. In the example of FIG. 3, the two signal input connectors 6a, 6b are each electrically connected to a pressure sensor 37, the two signal input connectors 6c, 6b are each electrically connected to a temperature sensor 36 and the signal input connector 6e is electrically connected to the filling level sensor 38. Thus, all electrical function components 2 are electrically connected to the micro-controller present on the circuit board 4, which assumes the control of the function components 2 in that via the LIN bus 17 it transmits control commands to these or receives and processes signals via the LIN bus 17 or via the signal input connectors 6a-6e from these.

As is noticeable in FIG. 3, all five signal input connectors 6a to 6e are led from the circuit board 4 and thus out of the housing interior 9 via a respective electrical connection line 11 to the outside to the housing 10 where a first housing connector 12a is arranged for forming these electrical connections. On the first housing connector 12a, electrical connection lines 12 can in turn be connected, which realise the desired electrical connection with the respective function component 2.

In this way, the mentioned function components 2, i.e. the two pressure sensors 37, the two temperature sensors 36 and the filling level sensor 38 are electrically connected to the circuit board 4 of the control/regulating device 3. Further, the electrical connectors 5 include a vehicle field bus connector, which in the example is formed as a CAN bus connector 8, for electrically connecting the control/regulating device 3 with a vehicle field bus—in the example a CAN bus 39—of the motor vehicle. The CAN bus connector 8 is also led from the circuit board 4 and thus out of the housing interior 9 via an electrical connection line 11 to the outside to the housing 10, where a second housing connector 12b is arranged. In a variant of the example that is not shown, the vehicle field bus—independently of the type of the component field bus—can be a LIN bus. In this case, the vehicle field bus connector 8 is a LIN bus connector.

Figure 4:
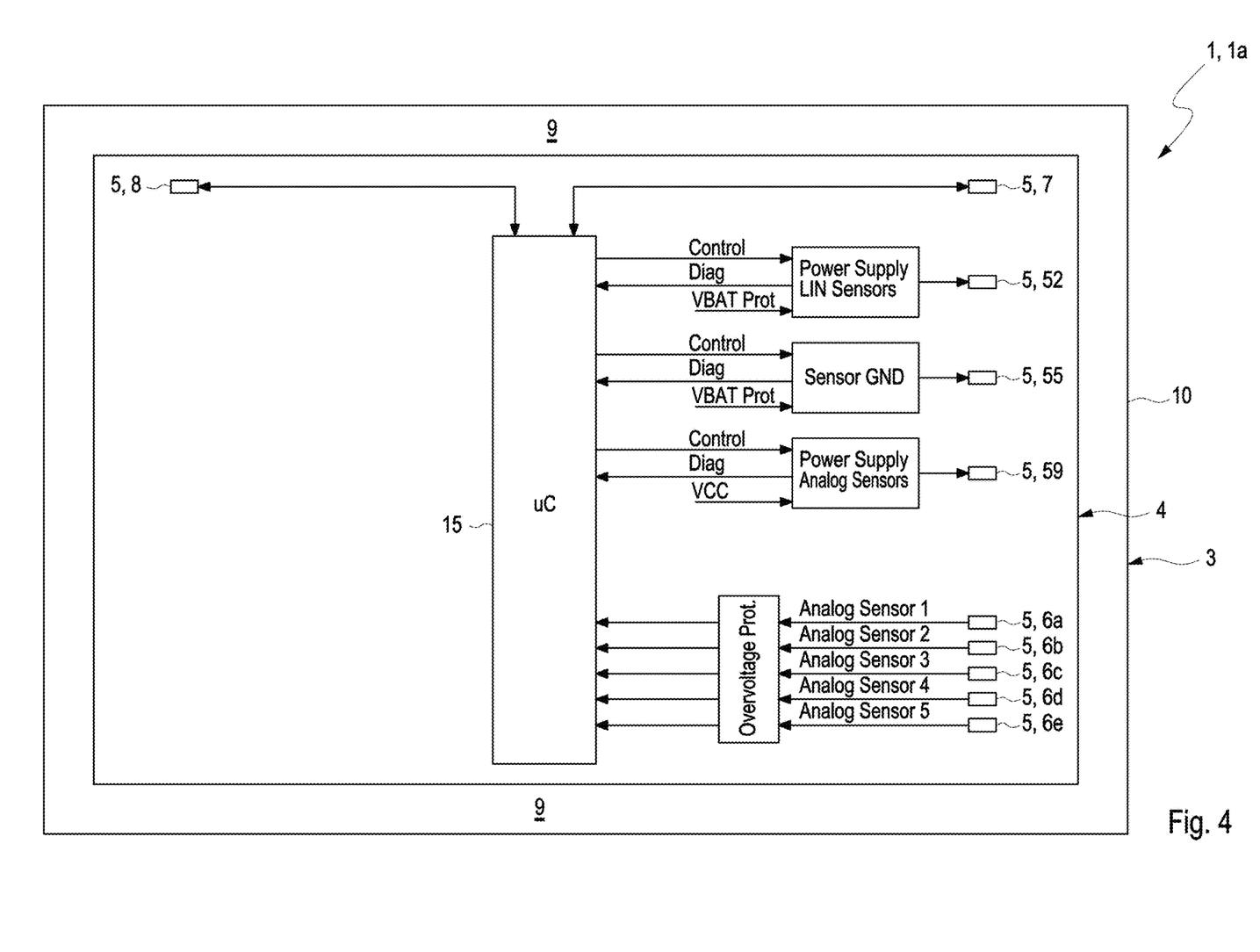

FIG. 4 shows the control/regulating device 3 with the circuit board 4 in a detailed representation. As is illustrated by FIG. 4, the mentioned electrical connectors 5 are altogether electrically connected to a micro-controller 15 of the control/regulating device 3 provided on the circuit board 4. Because of this, the micro-controller 15 is electrically connected both to the function components 2 that are electrically connected to the electrical connectors 5 and also to the CAN bus 39 of the motor vehicle. The micro-controller 15 can receive and process sensor signals provided by the sensors 36, 37, 38 via the electrical connection lines 12, 11 and via the signal input connectors 6a to 6e. Likewise, the micro-controller 15 can electrically control the function components 2, i.e. the valves 21 and the fluid pumps 22 connected to the LIN bus 17 via the LIN bus connector 7 and via the LIN bus 17.

Since with the heat management module 1a of the FIGS. 1 to 3 all electrical connectors 5 are utilised, all electrical connectors 5—as already mentioned—are also led out of the housing interior 9 via the said electrical connection lines 11. The control/regulating device 3 accordingly includes in the heat management module 1a according to the FIGS. 1 to 3 for each of the electrical connectors 5, i.e. for the five signal input connectors 6a to 6e and for the LIN bus, connector 7 and the CAN bus connector 8 a respective electrical connection line 11 by means of which the electrical connectors 5 are led from the circuit board 4 out of the housing interior 9. This means that the mentioned function components 2 of the fluid management module 1 or of the heat management module 1a are electrically connected to the micro-controller 15 via the electrical connector 5 that is electrically led out of the housing interior 9.

A further connector 5 provided on the circuit board 4 in the form of a supply connector 52 (see FIG. 3) serves for electrically connecting the circuit board 4 to an electrical voltage supply 50, which can be provided in particular by the motor vehicle. This electrical voltage supply 50 can be passed through the housing 10 in the form of an electrical supply line 51. In this case, the electrical supply line 51 can be connected to the electrical supply connector 52 by means of an electrical connection line 11. The electrical voltage supply 50 additionally serves for supplying the function components 2 formed by the valves 21, which for this purpose are connected to the electrical supply line 51 on the module side.

A further connector 5 provided on the circuit board 4 in the form of an earth connector serves for electrically connecting the circuit board 4 to an electrical earth 53, which can be provided in particular by the motor vehicle. This electrical earth 53 can be passed through the housing 10 in the form of an electrical earth line 54. In this case, the electrical earth line 54 can be connected to the earth connector 55 by means of a further electrical connection line 11.

As is noticeable in FIG. 3, an additional supply line 56 can also be passed through the housing 10 of the control/regulating device 3, to which the circuit board 4 is not electrically connected. The additional supply line 56 can also be connected to the electrical voltage supply 50 of the motor vehicle and serves for supplying the function components 2 formed by the fluid pumps 22, which for operating have to be supplied with a higher electrical output—for example of approximately 300 W each—than the circuit board 4 with the micro-controller 15 or the function components 2 formed by the valves 21.

The function components 2 connected to the signal input connectors 6a to 6e, i.e. the temperature sensors 36, the pressure sensors 37 and the filling level sensor 38 can be supplied with electric energy by the circuit board 4 by means of a separate low-voltage supply 57. For this purpose, these function components 2 can be connected to a low-voltage supply line 58 of the low-voltage supply 57, which in turn can be electrically connected to a connector 5 provided on the circuit board 4 and formed as electrical low-voltage supply connector 59. For this purpose, the low-voltage supply connector 59, as shown in FIG. 3, can be led out of the housing interior 9 to the first housing connector 12a by means of a further electrical connection line 11.

In further developments of the fluid management module 1 that are not shown, two or more LIN bus connectors 7 can also be provided on the circuit board 4, wherein a LIN bus 17 each with function components 2 of the fluid management module 1 connected to these can be connected to each existing LIN bus connector 7.

Figure 5:
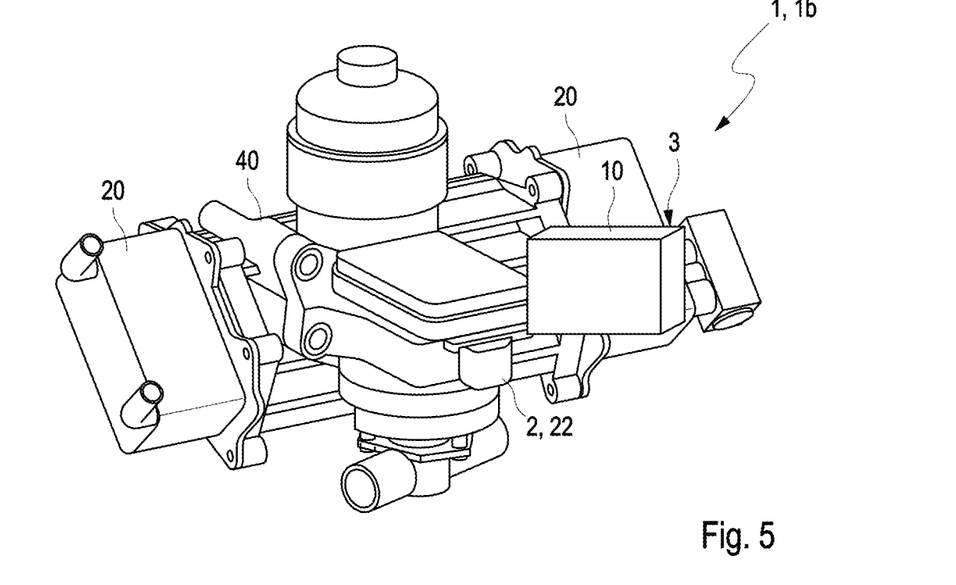
Figure 6:
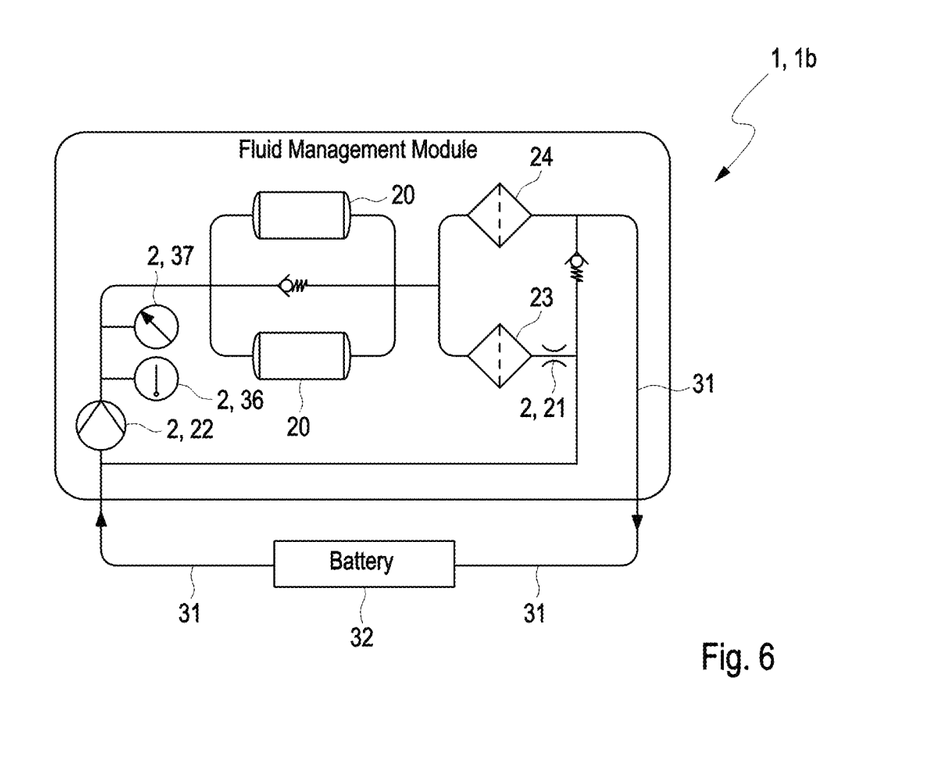
Figure 7:
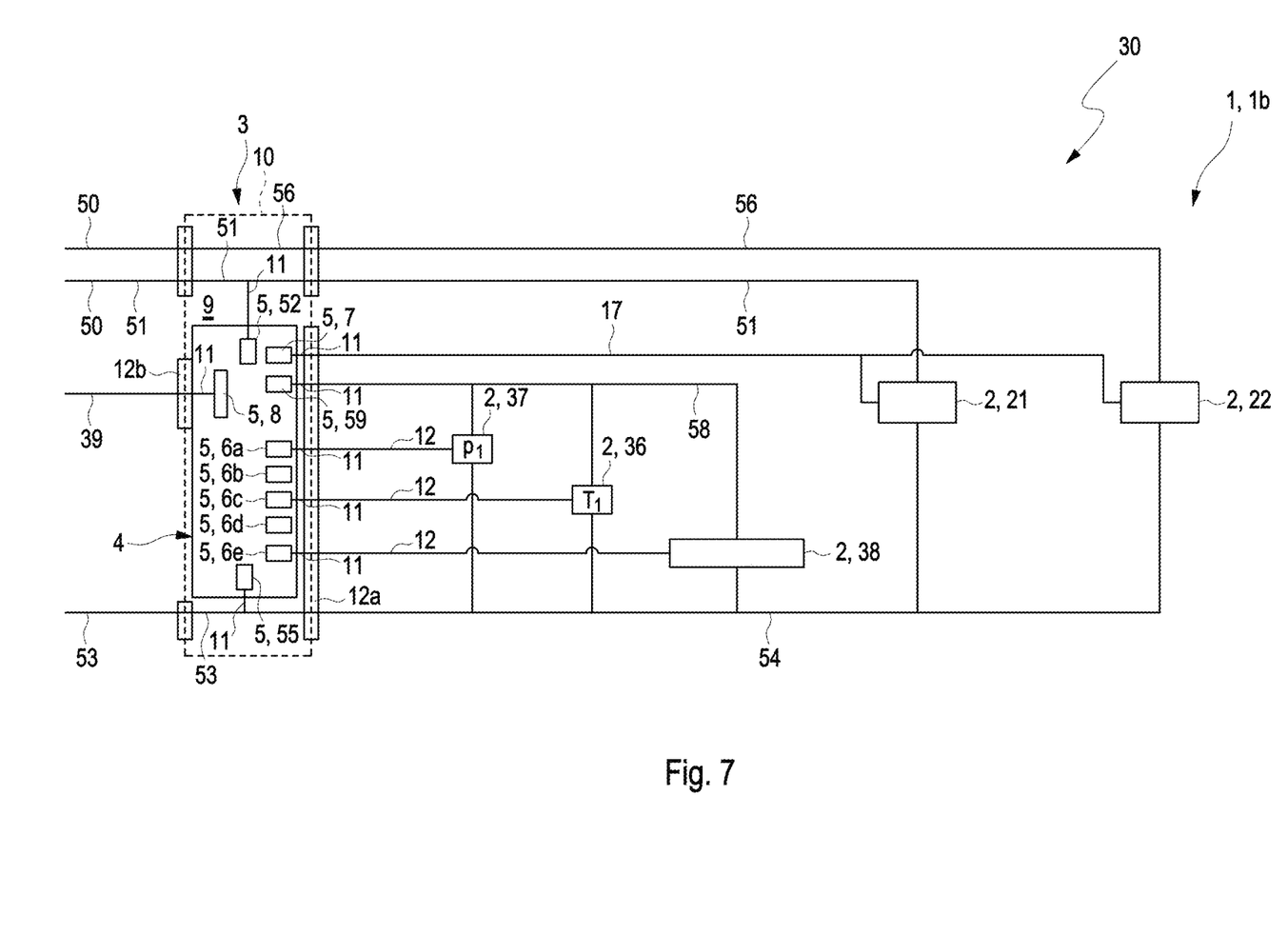

The FIGS. 5 to 7 show a variant of the example of the FIGS. 1 to 3. In this variant, the fluid management module 1 is formed as an immersion cooling module 1b for cooling an electric battery 32. According to the FIGS. 5 and 6, the immersion cooling module 1b—analogously to the heat management module 1a according to the FIGS. 1 to 3—is integrated in a temperature-control circuit 31 (see FIG. 6) that can be flowed through by a temperature-control fluid. The battery 32 to be temperature-controlled is also arranged in the temperature-control circuit 31 to be temperature-controlled by heat transfer from the or to the temperature-control fluid. The immersion cooling module 1b includes as function components 2 two chillers 20, a main filter 24, a bypass filter 23, an electrically controllable fluid pump 22 and an electrically controllable valve 21 which is merely shown schematically in the representation of FIG. 6.

From FIG. 6 it is additionally noticeable that as further electrical function components 2 a pressure sensor 37 and a temperature sensor 36 for determining fluid pressure and fluid temperature of the temperature-control fluid respectively are provided. In contrast with the heat management module 1a, only one pressure sensor 37 is provided instead of two pressure sensors 37, and instead of two temperature sensors 36, as in the heat management module 1a, only one single temperature sensor is provided. The filling level sensor 38 that is present with the heat management module 1a is no longer required with the immersion cooling module 1b. Likewise, in contrast with the heat management module 1a, there are no three-fluid pumps 22 provided with the immersion cooling module 1b but only a single electrically controllable fluid pump 22. The quantity of electrical function components in the case of the immersion cooling module 1b is thus reduced compared with the heat management module 1a explained above.

Compared with this, the control/regulating device 3 with the circuit board 4 and the micro-controller 15 is structurally identical with the immersion cooling module 1b, i.e. embodied identically to the control/regulating device 3 of the heat management module 1a. In particular, the connections 5, in particular the signal input connectors 6a-6e, on the circuit board 4 of the immersion cooling module 1b are embodied identically in terms of quantity and electrical wiring. Thus, the two fluid management modules 1 explained above, i.e. the heat management module 1a and the immersion cooling module 1b, together form a module arrangement 30, electrical connectors 5 of which provided on the respective circuit boards 4 of these are built identically.

However, the immersion cooling module 1b differs from the heat management module 1a in that the two electrical connectors 5 provided on the circuit board 4 in the form of the signal input connectors 6b and 6d are not led out of the housing interior 9, so that the micro-controller 15 via this connection is not connected to one of the function components 2. Because of the reduced quantity of function components 2, these two connections 5 or signal input connectors 6b and 6d are not required. Thus, in contrast with the heat management module 1a, the two electrical connection lines 11, by means of which the two electrical connectors 6b and 6d in the heat management module 1a are led out of the housing interior 9, can be omitted with the immersion cooling module 1b.

In another design not shown in the figures, the fluid management module can also be employed as cold management module, which as part of an air-conditioning system can be integrated in a refrigerant circuit of the air-conditioning system, which is flowed through by a refrigerant. In this variant, the cold management module can likewise comprise multiple electrically controllable valves but, instead of fluid pumps can be equipped with a compressor by means of which the refrigerant cannot only be conveyed but also compressed.

In a further variant likewise not explained by way of the figures, the fluid management module can be used as oil management module for cooling and filtering oil as temperature-control fluid.

Figure 8:
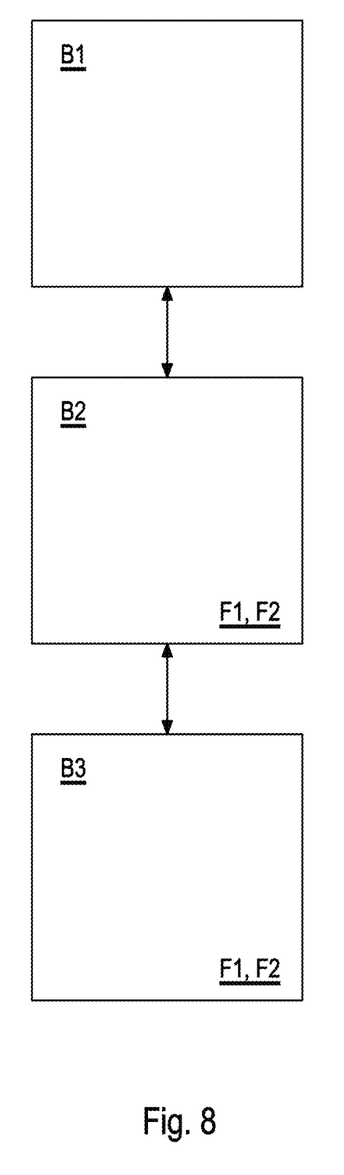

In the following, reference is made to the diagram according to FIG. 8. As is illustrated by the representation of FIG. 8, the control/regulating device 3 can be switched over between a first, second and third operating mode B1, B2, B3. In the first operating mode B1, control commands SB received from the CAN bus 39 are not processed by the micro-controller 15, but directly passed on to the LIN bus 17 for controlling the function component 2 concerned. In the second operating mode B2, by contrast, control commands SB received from the CAN bus 39 are processed by the micro-controller 5 as higher-ranking control commands USB. This means that the control of the function components 2 relative to the CAN bus 39 is carried out independently by the control unit 5.

Compared with this, no control commands provided by the CAN bus 39 are directly processed by the function components 2 in the second operating mode B2—neither in the third operating mode B3 still to be explained. The control/regulating device 3 rather controls preferably multiple function components 2 as reaction to higher-ranking control commands USB received from the CAN bus 39 in the second operating mode B2 and also in the third operating mode B3. For this purpose, corresponding control commands SB are transmitted by the control unit 3 via the LIN bus 17 to the function components 2.

Further, the control/regulating device 3 can be equipped or programmed in the second operating mode B2 and also in the third operating mode B3 for carrying out two or more function modes F1, F2 of the fluid management module 1. In the respective function mode F1, F2, the control of the function components 2 takes place according to a predetermined control strategy assigned to the at least one function mode F1, F2.

For example, a regulating loop with a regulating variable and with an adjusting variable that is adjustable in a function component 2 can be carried out in a function mode F1 by the control/regulating device 3. Here, a set point value of the regulating variable as higher-ranking control command USB can be provided by the CAN bus 39 to the control/regulating device 3, so that for setting the adjusting variable the function component 2 can be controlled by the control/regulating device 3 by means of corresponding control commands SB.

In the example of FIG. 3, the control/regulating device 3, further, can be switched over into a third operating state B3. In the second operating mode B2 explained above, the adjusting of a certain function mode F1, F2 or the switching over of the currently set function mode F1, F2 into another function mode F3 as reaction to a higher-ranking control command USB received by the control/regulating device 3 from the CAN bus 39 takes place. By contrast, the control/regulating device 3 in the third operating mode B3 assumes both the adjusting of a certain function mode F1, F2 and also the switching-over between two function modes F1, F2 by the control/regulating device 3 independently, without a higher-ranking control command USB having to be received from the CAN bus 39 for this purpose. Instead, additional information ZI, which are provided to the control/regulating device 3 via the CAN bus 39 can be processed by the control/regulating device 3.

The invention claimed is:

1. A fluid management module, comprising:
at least two function components;
at least one electrical control/regulating device that includes a housing surrounding a housing interior and a circuit board with electrical connectors, the circuit board including the electrical connectors arranged in the housing interior, wherein the electrical connectors include:
  a plurality of analogue signal input connectors and at least one component field bus connector, each for electrically connecting to a respective function component via a component field bus; and
  a vehicle field bus connector for electrically connecting to a CAN bus or LIN bus of a motor vehicle;
  wherein at least the vehicle field bus connector, the at least one component field bus connector and the plurality of analogue signal input connectors are electrically connected to a micro-controller of the at least one electrical control/regulating device provided on the circuit board;

wherein at least one of the at least two function components is electrically connected to at least one of the electrical connectors;

wherein the at least one of the electrical connectors is electrically led out of the housing interior via an electrical connection line for electrically connecting to the at least one function component; and wherein the electrical connectors include an electrical ground connector for electrically connecting the circuit board to an electrical ground, the electrical ground connector disposed in the housing interior and passes through the housing via an electrical ground line.

2. The fluid management module according to claim 1, wherein the electrical connection line of the at least one of the electrical connectors is led to a first housing connector that receives the at least one function component.

3. The fluid management module according to claim 1, wherein the at least one function component is electrically connected to the micro-controller via the electrical connector that is electrically led out of the housing interior.

4. The fluid management module according to claim 1, wherein at least some of the electrical connectors present on the circuit board are electrically led out of the housing interior to the outside.

5. The fluid management module according to claim 1, wherein all of the electrical connectors present on the circuit board are electrically led out of the housing interior to the outside.

6. The fluid management module according to claim 1, wherein at least one other of the electrical connectors provided on the circuit board is not led out of the housing interior, so that the micro-controller via this connection is not connected to a respective function component.

7. The fluid management module according to claim 1, wherein all of the electrical connectors led out of the housing interior of the circuit board are electrically connected to a respective function component.

8. The fluid management module according to claim 1, wherein at least one other electrical connector provided on the circuit board is led out of the housing interior and not electrically connected to a respective function component.

9. The fluid management module according to claim 1, wherein on the circuit board at least two component field bus connectors are provided, wherein at least one of the at least two function components is electrically connected to each of the at least two component field bus connectors.

10. The fluid management module according to claim 1, wherein at least one of:
the at least one function component includes an electrically controllable valve;
the at least one function component includes a controllable fluid pump;
the at least one function component includes a temperature sensor; and
the at least one function component includes a pressure sensor.

11. The fluid management module according to claim 1, further comprising a component carrier;
the control/regulating device includes a housing that is releasably or non-releasably fastened on at least one of the component carrier and at least one of the function components; and
the releasable fastening of the housing is provided by at least one of a screw connection, a clip connection, and a latching connection, and the non-releasable fastening of the housing is provided by at least one of a rivet connection, a soldered connection, a welded connection, and a bonded connection.

12. A module arrangement, comprising:
a first fluid management module and at least one second fluid management module, the first fluid management module and the at least one second fluid management module respectively including:
at least two function components;
at least one electrical control/regulating device that includes a housing surrounding a housing interior and a circuit board with electrical connectors, the circuit board including the electrical connectors arranged in the housing interior, wherein the electrical connectors include;
a plurality of analogue signal input connectors and at least one component field bus connector, each for electrically connecting to a respective function component via a component field bus, and
a vehicle field bus connector for electrically connecting to a CAN bus or LIN bus of a motor vehicle;
wherein at least the vehicle field bus connector, the at least one component field bus connector and the plurality of analogue signal input connectors are electrically connected to a micro-controller of the at least one electrical control/regulating device provided on the circuit board;
wherein at least one of the at least two function components is electrically connected to at least one of the electrical connectors;
wherein the electrical connectors provided on the respective circuit board are structured identically;
wherein the at least one of the electrical connectors is electrically led out of the housing interior via an electrical connection line for electrically connecting to the at least one function component; and
wherein the electrical connectors include an electrical ground connector for electrically connecting the circuit board to an electrical ground, the electrical ground connector disposed in the housing interior and passes through the housing via an electrical ground line.

13. The module arrangement according to claim 12, wherein the circuit board of the first fluid management module and the circuit board of the at least one second fluid management module are structured identically.

14. The module arrangement according to claim 12, wherein at least one electrical connector provided on the circuit board of the first fluid management module and the circuit board of the at least one second fluid management module that are each structured identically are, in the case of the first fluid management module electrically connected to the at least one function component of the first fluid management module and not electrically connected to a respective function component of the second fluid management module.

15. The module arrangement according to claim 12, wherein at least one of the electrical connectors of the at least one second fluid management module is not connected to a respective function component and not electrically led from the circuit board of the at least one electrical control/regulating device out of a housing interior of the at least one second fluid management module.

16. The module arrangement according to claim 12, wherein the at least one electrical control/regulating device of the first fluid management module is in direct communications connection with the at least one electrical control/regulating device of the at least one second fluid management module, so that the at least one electrical control/ regulating device of the first fluid management module assumes the function of a main control/regulating device and controls the at least one electrical control/regulating device of the at least one second fluid management module functioning as a sub-control/regulating device.

17. A modular system, comprising:
a module reservoir including a plurality of basic modules that each include at least two function components for a fluid, wherein the individual basic modules differ from one another in at least one of type and quantity of the included function components from one another;
at least one electrical control/regulating device that includes a housing surrounding a housing interior and a circuit board with electrical connectors, the circuit board including the electrical connectors arranged in the housing interior, wherein the electrical connectors include:
at least five analogue signal input connectors and at least one component field bus connector, each for electrically connecting to at least one function component of each basic module;
a CAN bus connector for electrically connecting to a CAN bus of a motor vehicle;
wherein at least the vehicle field bus connector, the component field bus connector and the at least five analogue signal input connectors are electrically connected to a micro-controller of the at least one electrical control/regulating device provided on the circuit board;
wherein the at least one electrical control/regulating device is structured to be combinable with each of the basic modules such that the at least one electrical control/regulating device and the selected basic module together forms a fluid management module;
wherein at least one of the electrical connectors is electrically led out of the housing interior via an electrical connection line for electrically connecting to at least one of the at least two function components; and
wherein the electrical connectors include an electrical ground connector for electrically connecting the circuit board to an electrical ground, the electrical ground connector disposed in the housing interior and passes through the housing via an electrical ground line.

18. A motor vehicle, comprising:
at least one of an internal combustion engine and an electric drive;
a temperature-control circuit for temperature-controlling at least one component of the motor vehicle, wherein the temperature-control circuit includes a fluid management module, the fluid management module including:
at least two function components;
at least one electrical control/regulating device that includes a housing surrounding a housing interior and a circuit board with electrical connectors, the circuit board including the electrical connectors arranged in the housing interior, wherein the electrical connectors include:
a plurality of analogue signal input connectors and at least one component field bus connector, each for electrically connecting to a respective function component via a component field bus, and a vehicle field bus connector for electrically connecting to a CAN bus or LIN bus of a motor vehicle;
wherein at least the vehicle field bus connector, the at least one component field bus connector and the plurality of analogue signal input connectors are electrically connected to a micro-controller of the at least one electrical control/regulating device provided on the circuit board;
wherein at least one of the at least two function components is electrically connected to at least one of the electrical connectors;
wherein the at least one of the electrical connectors is electrically led out of the housing interior via an electrical connection line for electrically connecting to the at least one function component; and
wherein the electrical connectors include an electrical ground connector for electrically connecting the circuit board to an electrical ground, the electrical ground connector disposed in the housing interior and passes through the housing via an electrical ground line.

19. A method for operating a fluid management module, wherein via a component field bus, at least one function component is connected to a component field bus connector or LIN bus connector or CAN bus connector and is connected to a micro-controller in a data-transmitting manner, the method comprising the steps of:
switching a control/regulating device over between a first operating mode and at least a second operating mode, the control/regulating device including a housing surrounding a housing interior and a circuit board with electrical connectors, the circuit board including the electrical connectors arranged in the housing interior, wherein the electrical connectors include:
a plurality of analogue signal input connectors and the component field bus connector, each for electrically connecting to a respective function component via a component field bus; and
a vehicle field bus connector for electrically connecting to a CAN bus a LIN bus of a motor vehicle;
wherein at least the vehicle field bus connector, the component field bus connector and the plurality of analogue signal input connectors are electrically connected to the micro-controller of the control/regulating device provided on the circuit board;
wherein the at least one of the electrical connectors is electrically led out of the housing interior via an electrical connection line for electrically connecting to the at least one function component;
wherein the electrical connectors include an electrical ground connector for electrically connecting the circuit board to an electrical ground, the electrical ground connector disposed in the housing interior and passes through the housing via an electrical ground line;
receiving control commands from a vehicle field bus in the first operating mode and passing the control commands on by the micro-controller to the component field bus unchanged at least in content for controlling the at least one function component connected to the component field bus connector via the component field bus, wherein the control commands in the first operating mode are passed on unprocessed by the micro-controller to the component field bus; and
in the at least one second operating mode, receiving control commands from the vehicle field bus and processing the control commands by the micro-controller such that the control of the at least one function component is carried out by the micro-controller.

20. The method according to claim 19, wherein in the at least one second operating mode the control/regulating device controls the at least one function component in response to at least one higher-ranking control command received from the vehicle field bus via the component field bus.

21. The method according to claim 19, wherein in the at least one second operating mode no control commands provided by the vehicle field bus are passed on directly by the at least one function component via the component field bus to another function component.

* * * * *